United States Patent Office 3,499,328
Patented Mar. 10, 1970

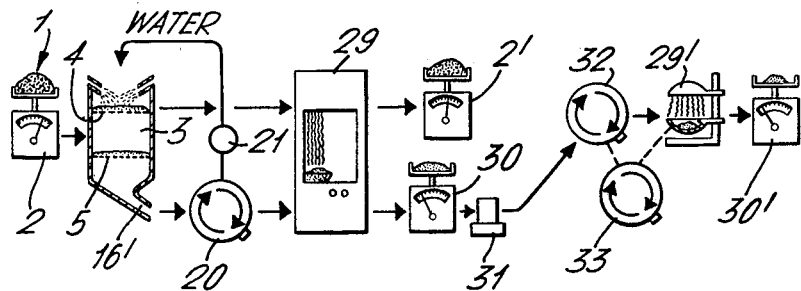
Fig. 2.
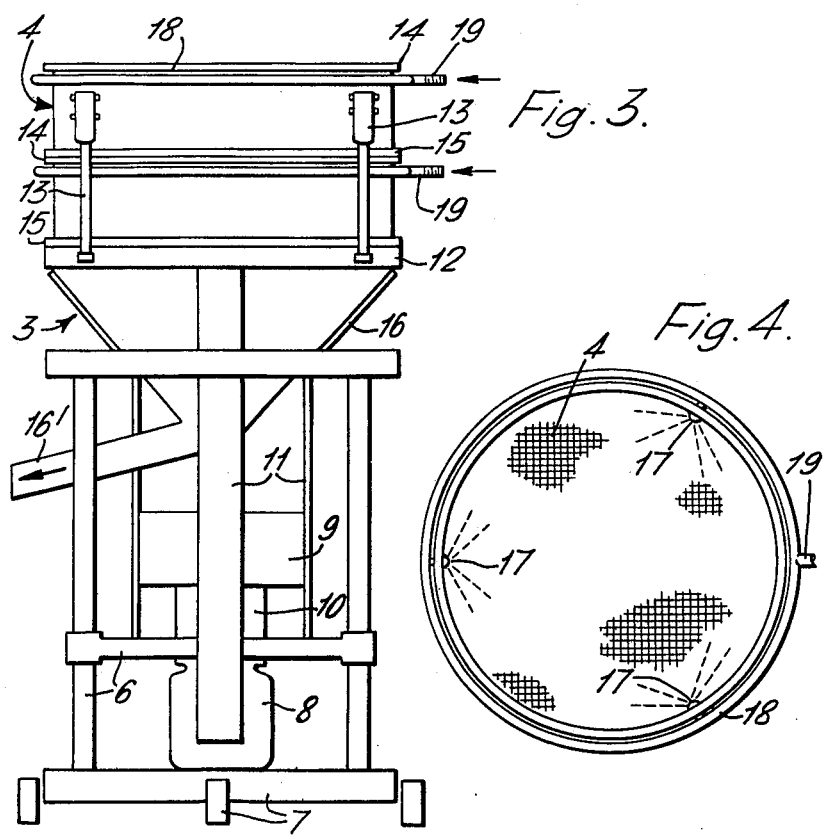
Fig. 3.
Fig. 4.

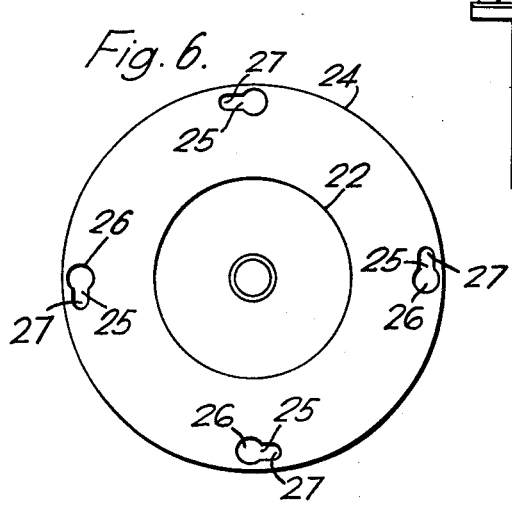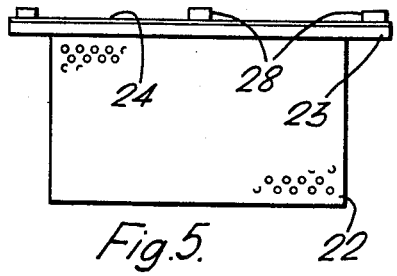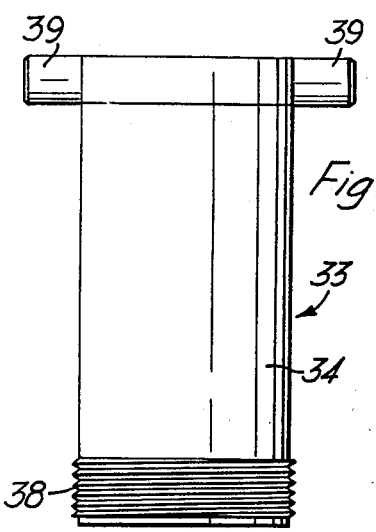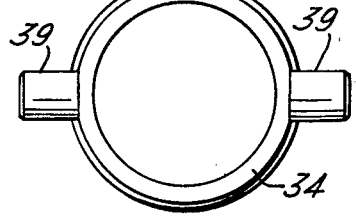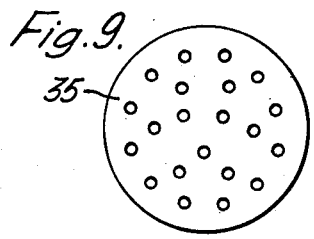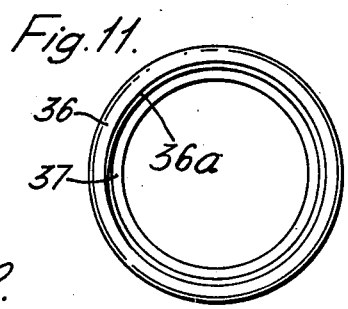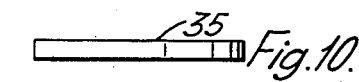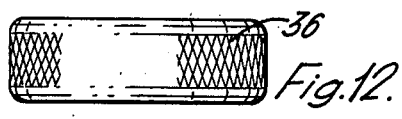

3,499,328
ANALYSIS OF UNHARDENED CONCRETE
Robert Anthony Kenny, Radlett, and Bruce Murray Lionel Gregorie, Ealing, England, assignors to John Laing Research and Development Limited, London, England, a British company
Filed July 17, 1967, Ser. No. 653,852
Claims priority, application Great Britain, July 23, 1966, 33,232/66
Int. Cl. G01f 15/14; G01j 5/04
U.S. Cl. 73—432                                  10 Claims

ABSTRACT OF THE DISCLOSURE

Unhardened concrete is analysed for accuracy of the aggregate/cement ratio by taking a sample of known weight and wet sieving it to separate the cement and silt as an aqueous slurry from the coarse and fine aggregates. The slurry is dewatered in a centrifuge and all the solids are dried in a microwave radiation oven and weighed. The dry slurry, or a known sub-sample thereof, is then ground to a given particle size—preferably between 10 and 60 microns—and fed to a dense medium separator using bromoform as the dense medium. The separated cement and silt fractions are filtered in a centrifuge, dried by microwave radiation, and separately weighed, the weight of silt being added to that of the fine aggregate.

This invention relates to the analysis of unhardened concrete, by which is meant fresh concrete in which there has been no significant chemical hardening and in which the physical contact between the particles of cement and the sand and stone or the like can be readily broken by simple physical means such as washing with water.

Processes of analysis of unhardened concrete are known for determining the cement/aggregate ratio, but these require knowledge of the properties of the separate materials constituting the sample under examination, and furthermore take a considerable time. In addition, the accuracy of the results obtained is dependent on the degree of identity between the properties of the separate materials taken as the standard of comparison and those of the materials actually found in the sample.

It is an object of the present invention to provide a method of analysis of a sample of unhardened concrete which can be expeditiously carried out without the aforesaid prior knowledge, and if desired, before the concrete is placed.

Most of the conventional aggregates used in concrete manufacture and especially sand and like fine aggregates, contain silt, which is defined herein as any solid material other than cement passing 100 B.S. sieve. Also, all cements contain a proportion of matter whose specific gravity is less than 2.9. Furthermore, the density of silt is not constant, some having the same density as cement.

In general, however, the specific gravity of the silt, that is to say material which passes through a No. 100 British Standard Sieve and which is derived from the coarse and fine aggregates, commonly present in conventional concreting aggregates has been found to be less than about 2.9, whereas the specific gravity of cement is greater than this value. Hence, although the particle sizes of silt and cement are similar, this difference in specific gravities affords a practical basis of separation of the two materials.

If the cement content as determined by the process according to the present invention is unexpectedly high, the error may be due to the presence of silt of approximately the same density as the cement. If so, this will normally be recognizable by inspection of the dried cement fraction obtained. Similarly, if the silt fraction obtained is clearly suspect, the starting materials of the mix should be tested. If the original cement is old, some of it will have become hydrated and will behave as a less dense silt. The test results can be corrected in the light of tests on the starting materials. So long as the cement and silt behaviour in the test is normal, an accuracy of better than ±3% can be anticipated.

Since most of the silt in a mix comes from the sand or like fine aggregate, its weight as determined by a test according to the present invention will be added to that of the sand.

The process of the present invention can be used on concrete which is up to about 2 hours old, but beyond this age the chemical changes in the cement introduce errors which will normally be unacceptable.

According to the present invention, the coarse and fine aggregates, cement, and silt fractions are separated, dried and weighed, the coarse and fine aggregates being first separated from a cement/silt slurry. This slurry is then dried by microwave radiation and the resultant dried cake is pulverised.

If desired, the slurry may first be subdivided in known proportion so as to reduce the quantity of pulverised cake to be subsequently processed. After pulverising, the cement and silt particles are separated—preferably in a dense liquid medium, such as bromoform, having a specific gravity of about 2.9.

For accurate results, it is essential that the particles of cement should be dried right through, both the free and the combined water being removed. Microwave radiation is particularly effective for this purpose.

Drying by microwave radiation is also much quicker than drying by sensible heat techniques and also avoids the risk, which is always present when sensible heat is used, of the case-hardening of the sample, with the attendant serious problems of particle separation.

Advantageously, the coarse and fine aggregates are separated from the cement/silt slurry by a wet sieving process, and are then separately dried and weighed.

In the description which follows, it will be convenient to refer to the fine aggregate as sand.

A practical embodiment of the present invention will now be described by way of example only, with reference to the accompanying partly diagrammatic drawings, in which:

FIGURE 1 is a flow chart;
FIGURE 2 shows schematically apparatus for carrying out the process of the invention;
FIGURE 3 is a side elevation of a two-stage wet sieving machine;
FIGURE 4 is a plan view showing the upper sieve of FIGURE 3;
FIGURE 5 is a side view of a centrifuge basket with a removable top plate;
FIGURE 6 is a plan view of the top plate of FIGURE 5;
FIGURE 7 is a side view of a bucket or tube of a centrifuge;
FIGURE 8 is a plan view of the bucket or tube of FIGURE 7;

FIGURE 9 is a plane view of a base of the said bucket or tube;

FIGURE 10 is a side view of the base of FIGURE 8;

FIGURES 11 and 12 are plan and side views, respectively, of a securing ring of the bucket or tube of FIGURE 7, and FIGURES 13 and 14 are views similar to FIGURE 5 of a modified centrifuge bucket.

Figure 1:
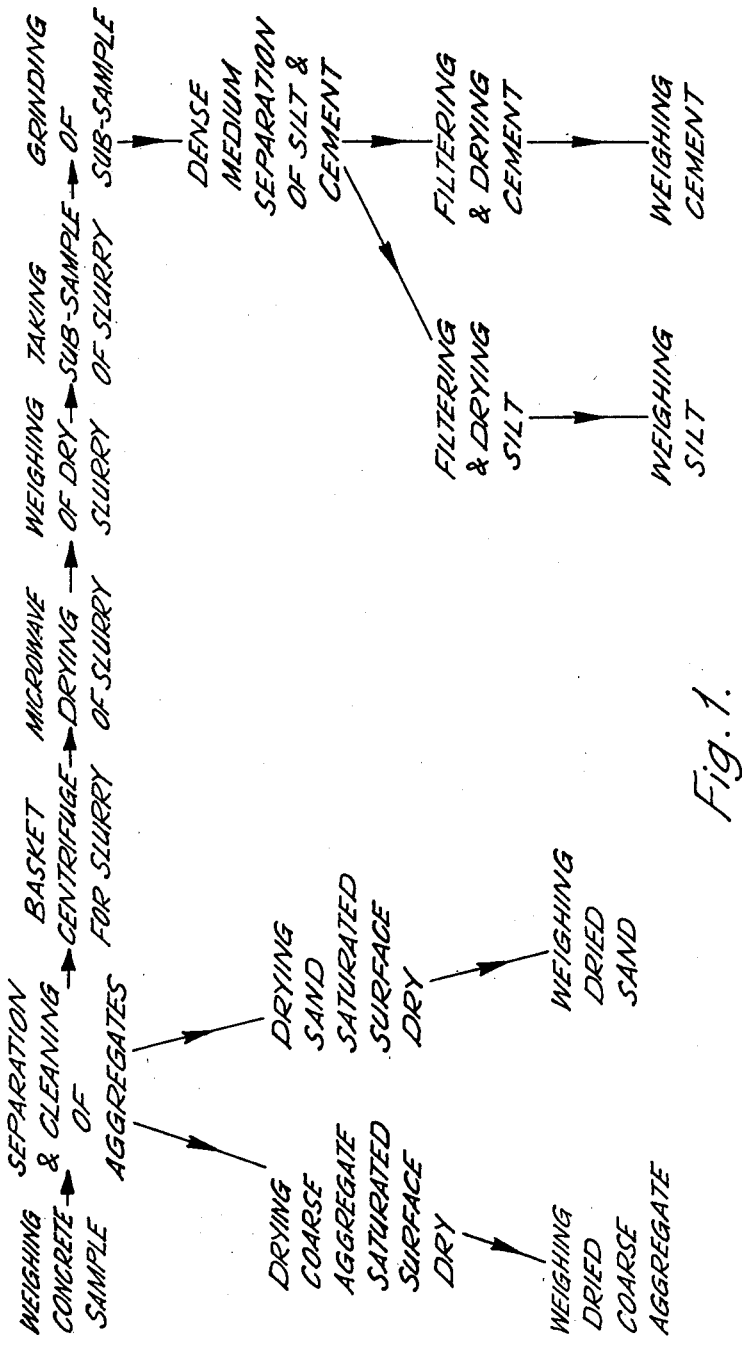

As shown by the flow chart in FIGURE 1, a sample is taken of the concrete to be analysed and the sample, suitably of about 15 lbs. in weight, is subjected to the first separation process in which the coarse aggregate and the sand are cleaned of silt and cement and are separated the one from the other. The concrete, which is in the wet condition, should generally be subjected to the process of analysis before it is more than two hours old.

FIGURE 2 shows the sample 1 being weighed on a Mettler 10,000 gm. capacity scale 2 from which the entire weighed sample is transferred to the upper sieve of a two-stage wet sieving machine 3.

The machine 3 is a two-stage wet sieving machine comprising a 3/16 inch mesh sieve 4 for retaining the coarse aggregate and a 100-mesh sieve 5 for retaining the fine aggregate or sand. FIGURES 3 and 4 show one appropriate form of sieving machine which basically is a double-deck sieving machine manufactured by Russel Constructions Limited but is modified by the provision of water spraying means.

The sieving machine comprises a rigid frame 6 mounted on wheels 7 and carrying an electric motor 8 of hermetic construction which drives the vibration generator 9 through a flexible coupling 10. The vibration generator 9 is coupled to upright vibratory elements 11 of the machine which at their upper ends are secured to a mounting ring 12 to which the sieves 4 and 5 are releasably secured by manually operable quick release toggle clips 13 acting between the mounting ring and a lower flange 15 of the upper sieve 4. Apart from differences in mesh, the sieves 4 and 5 are similar, each including a cylindrical wall provided with upper and lower flanges 14 and 15 respectively. The lower flange 15 of the sieve 4 seats upon the upper flange 14 of the sieve 5 and the lower flange 15 of the sieve 5 seats upon the mounting ring 12 below which is a funnel 16 having an outlet spout 16' for slurry.

As indicated in FIGURE 2, water is sprayed onto the material in the top sieve 4. Preferably, water is sprayed onto the material in each of the sieves, and to this end (in the machine illustrated by FIGURES 3 and 4) peripherally distributed spraying nozzles 17 are provided for each sieve and are arranged to spray, radially inwardly and downwardly, water supplied from a ring manifold 18 located adjacent the upper flange 14 of the sieve and having a water inlet 19 connected to receive water through a flexible hose.

In the operation of the machine 3, the motor 8 is energized to vibrate the sieve 4 and 5 and water under pressure is supplied to the nozzles 17 of the sieves. As a result, the sand is separated from the coarse aggregate and is caught and retained in the sieve 5, the coarse aggregate being retained in the sieve 4. At the same time the coarse aggregate and the sand are rapidly and effectively cleansed of the cement and silt and the resultant slurry is discharged through the spout 16'.

As indicated by the flow chart of FIGURE 1, the slurry resulting from the first separation process is delivered to a first stage basket centrifuge. Thus, as indicated by FIGURE 2, the spout 16' delivers the slurry from the machine 3 to a centrifuge 20 which effects separation of water from the slurry. The separated water is recirculated by a mono-type pump 21 to the machine 3, a suitable condition for the washing water being 4.5 litres circulating at a rate of 26 litres a minute.

Suitably, the slurry is centrifuged for 2½ minutes at a speed of 2100 r.p.m., giving 565 g., in a hydraulic twill-lined perforated basket, the lining being in the form of a removable bag. Such a basket is illustrated in FIGURES 5 and 6 of the drawings which show a cylindrical basket 22 having perforated sides and a reinforcing top flange 23 provided with a readily detachable top plate 24. As shown, apertures 25 in the top plate 24 cooperate with headed studs 28 on the flange 23 in locating the top plate. Thus each aperture 25 comprises a circular part 26 and a part 27 extending from the circular part circumferentially of the top plate and of a width less than the diameter of the part 26. The heads of the studs 28 are located, and are of a diameter, to pass through the respective circular parts 26 of the apertures 25 and the undersurfaces of the stud heads are spaced from the upper surface of the flange 23 sufficiently to allow the top plate 24 at the edges of the parts 27 of the apertures to pass below the said surfaces. Consequently, by lowering the top plate 24 on to the flange 23 when so oriented that the heads 28 of the studs pass through the parts 26 of the apertures 25 and rotating the top plate in a clockwise direction as seen in FIGURE 6 relatively to the flange 23, the top plate is held by the studs to the basket. Conversely, by rotating the top plate in a counter-clockwise direction relatively to the flange 23, the top plate may readily be released from the basket. The removal of the top plate from the basket enables the whole of a charge of partially de-watered slurry to be readily removed from the basket.

The centrifuging action takes place concurrently with the first separation process and this phase of the process is completed in about 2½ minutes.

The centrifuge 20 may be of a type manufactured by Thomas Broadbent and preferably the basket is bodily removable.

If desired, the sieving machine and the centrifuge may be mounted on a common frame as a single unit with the sieving machine disposed above the centrifuge and arranged for its outlet spout to discharge into the centrifuge, the spout being readily detachable from the funnel by a suitable quick-release device so that the centrifuge basket may be emptied without difficulty. Advantageously the drives for the sieving machine and the centrifuge are then fed from a common control panel.

If desired, instead of providing spray nozzles around the circumference of the top sieve of the sieving machine a spray nozzle may be mounted centrally above the sieve on a water pipe arm hinged so that it may be raised away from the sieve.

The weight of slurry may be expected to include about 20% of water after dewatering.

The flow chart of FIGURE 1 shows that the coarse aggregate, the sand and the centrifuged slurry are dried and FIGURE 2 shows a micro-wave oven 29 in which rapid drying of the various constituents is effected. Suitable for this purpose is a microwave drying oven of a type manufactured by Elliott Electronic Tubes Ltd. This oven operates at a frequency of 2450 mc./sec. generated by a magnetron and is provided with a power regulator and a process timer. The oven is also preferably provided with a self-contained heat-exchanger. The use of a power regulator and a process timer enables a high degree of repeatability to be achieved. Suitably the magnetron is operated at a current of 325 ma.

As indicated by the flow chart, the dried slurry is weighed and a sub-sample of the dried slurry is taken and is ground, preferably to a particle size of between 10 and 60 microns. The size of the sub-sample depends on the size of centrifuge 32 used in the second separation process as described below, but a sub-sample of 1 gm. in weight will normally be suitable.

In FIGURE 2 a scale 30, suitably a Mettler scale of 120 gm. capacity, is shown for weighing the sub-sample and for determining the total weight of dried slurry, suitably by weighing the dried slurry left after extraction of the sub-sample. A grinding mill is indicated at 31, this preferably being a cutter type of mill; and the centrifuge is indicated at 32.

Alternatively, however, the sub-sample of slurry is taken after dewatering but before drying in the microwave oven 29. In this case, the sub-sample is taken as a vertical slice of slurry from the centrifuge lining or basket. Such a slice is representative of the whole mass of slurry, and conveniently weights between about 30 gm. and 60 gm. It is laid on a tray in a layer about ½" thick and can be dried in the microwave oven at an approximate temperature of 100° C. in about 3 minutes. The period of drying is a function of the size and weight of the sub-sample, and its termination is critical to avoid overheating of the cement particles, since this involves chemical change. The end of the drying period is marked by a sudden rise in the magnetron current, and this phenomenon may be used to operate an automatic cut-out in the oven power supply.

The remainder of the slurry, and also the aggregate fractions, can if necessary be dried at the same time provided that no one batch masks or shades any other batch. The aggregates are only required to be dried to the state known in the art as "saturated surface dry," which means they are dry on the surface but any water absorbed by the particles is not driven off. The dried coarse aggregate and sand are then weighed on a scale 2', which may be the same item of equipment as the scale 2.

The mill 31 is arranged to operate with a pre-set grinding time in order to obtain repeatable particle sizes of the ground dried slurry.

The second stage centrifuge 32 is a dense medium separator using a conical centrifuge tube in which the liquid medium, such as bromoform, has an approximate density of 2.9 gm./cm.$^3$, the centrifuge giving a relative centrifugal force of 2500 g. With the sub-sample of 1 gm. in weight 10 ml. of dense medium was used, the centrifuging time being 2 minutes and the peripheral centrifuge speed being 3748 feet per minute. After separation, the light fraction, that is the silt, is removed by decantation, preferably in a jig which prevent the dense medium from falling below a given level in the centrifuge tube or vessel.

The flow chart of FIGURE 1 shows that after separation of the silt and cement, the silt and cement fractions are filtered and finally the said fractions are dried and weighed. When the cement fraction is weighed, it should be checked for contamination by a significant proportion of dense or "sinking fraction" silt, in respect of which a correction factor ought to be applied in the final anaylsis. The check may be visual; for example, silt is normally of a different colour from dried cement, and if the dried cement obtained from the process contains a significant proportion of silt it will appear speckled or patchy in colour. A visual check with the aid of a magnifying glass will also reveal whether the dried cement contains particles of recognisably different size; silt particles are normally larger than cement particles.

Another test which can be applied to the dried cement is a texture test; if cement is rubbed between the fingers, it feels smooth, but silt is gritty, and if it is present in significant proportions in the cement it can readily be detected by a rubbing test.

A further check can be made on the cement by ascertaining the source of the sand used in the original mix. If it comes from an area known to be rich in, say, ironstone, the silt will almost inevitably be dense and will sink with the cement in bromoform. If the dense silt content of the sand is already known, a correction can be applied to the test results, but if it is not known, the starting materials should be analysed to determine the necessary correction. Alternatively, a second cement/silt separation may be made using a dense medium whose specific gravity is greater than that of cement, so that the latter becomes the floating fraction. From this second separation, the sinking fraction of the silt is readily found, and its value can be added to that of the floating fraction obtained in the first (bromoform) separation.

Thus have been established:

(1) the weight of dry coarse aggregate
(2) the weight of dry sand (3/16" to 100 mesh)
(3) the weight of silt which passed the 100 mesh sieve.
(4) the weight of cement which passed the 100 mesh sieve.

The filtering of the silt and cement fractions is suitably effected by a third stage centrifugal filtration, preferably using the same centrifuge machine as that employed in the second stage separation process but using a different centrifuge tube or bucket. This third stage centrifuge is indicated in dotted lines at 33 in FIGURE 2, and in more detail in FIGURES 7 to 12.

As shown by FIGURES 7 to 12, the centrifuge tube 33 comprises a cylinder 34, a separate perforated base 35, in the form of a flat disc and a knurled base securing ring 36 internally threaded at 36a and formed with an internal annular flange 37 to engage and retain the base 36. The cylinder 34 is formed at its lower end with a thread 38 complementary to the thread on the ring 36 and at its upper end with trunnions 39 by which it is pivotally supported in a driving yoke so that its base 35 can swing upwards and outwards at the operating speed in conventional manner.

The perforated base 35 carries on its upper face a suitable filter medium (not shown), and the two components are mounted on the cylinder 34 by the knurled ring 36. After the centrifuging process has been completed, the knurled ring 36 is unscrewed to release the base 35 and its filter medium. Conversely, by unscrewing the ring, the base 35 is readily released from the cylindrical part 34 for the collection of the filtered silt or cement fraction.

FIGURE 2 of the drawings shows one of the fractions being transferred to drying means 29', which is conveniently constituted by an infra-red oven. The fraction, free of the dense medium, is weighed on the scale 30', which may be the same article as the scale 30.

In a modification of the process described above, the full quantity of slurry is processed from the weighing stage 30 (FIGURE 2) onwards.

Figure 13:
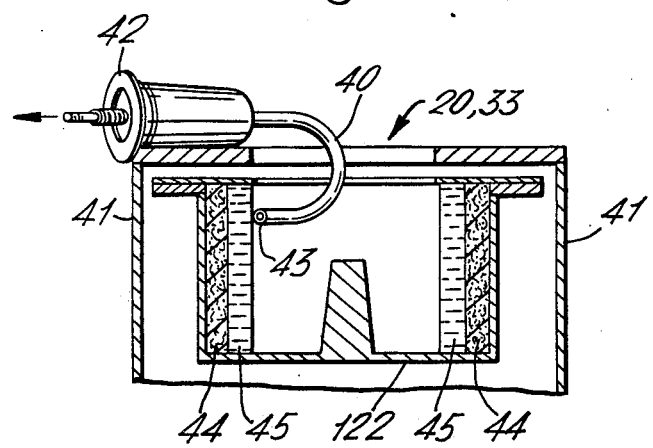
Figure 14:
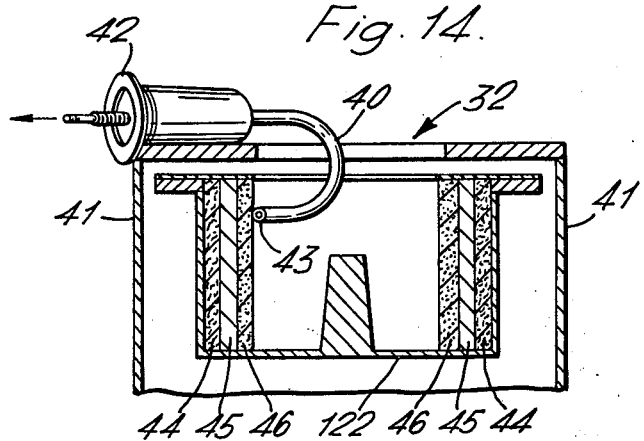

By using a modified form of the centrifuge illustrated in FIGURES 5 and 6, the same piece of apparatus can be used at each centrifuging stage in the process, thus economising on equipment. This modification is shown in FIGURES 13 and 14, and consists of a solid-walled bucket 122 into the mouth of which projects the lower end of a skimmer pipe or scoop 40 whose upper end discharges into a liquid receiver (not shown). The pipe or scoop 40 is mounted on the centrifuge casing 41 so as to be traversible radially of the bucket 122 by means of a micro-meter screw 42, and its lower end is bent to present an inlet opening or mouth 43 having its axis horizontal and tangential to a circle drawn about the axis of rotation of the bucket 122. This mouth 43 is oppositely directed to the direction of rotation of the bucket, and its height is adjustable relatively to the rim of the bucket 122.

In the operation of this modified machine as the first stage centrifuge 20 or the third stage centrifuge 33 (FIGURE 13), the solids build up in a vertical layer 44 around the wall of the bucket 122, the liquid forming an inner layer 45. The skimmer pipe or scoop 40 is located in the mouth of the bucket 122 radially inward of the liquid (water) layer and traversed radially outwards by the micrometer screw 42 until the mouth 43 reaches the inner edge of the layer 45. The water is forced up the pipe 40 and may be recirculated to the wet sieving machine 3 via the pipes 19.

When used as the second stage centrifuge 32 (FIGURE 14), the cement forms the layer 44 and the silt concentrates in an inner layer 46 around the inner boundary of the liquid (bromoform) layer 45. The silt can thus be drawn off in a suspension of bromoform, and then filtered.

If, in the original mix, certain materials such as barytes and magnetite are used as aggregate, the silt will be predominantly of higher specific gravity than the cement. In such a case, a dense liquid medium having an appropriate specific gravity higher than the bromoform mentioned above will be used in the second stage centrifuge 32, and the cement fraction will then form the inner layer 46 (FIGURE 14) and the silt will form the outer layer 44.

Microwave drying is very rapid and the whole analysis by the process described can be completed in a quarter of an hour, or even less. This means that a load of fresh concrete from a mixer can be sample analysed for compliance with the specification before it has to be placed, and a considerable economy can be effected.

Not only may the process be carried out with great rapidity but also results of high accuracy may be obtained, as is proved by the details of tests carried out as shown below.

Although a specific flow chart has been described, it will be understood that modifications may be made to suit particular requirements, for example, the sub-sample, after drying is weighed and after the second separation process one of the two constituents (silt particles and cement) is also weighed, the weight of the other constituent being deduced from the knowledge of the two known dry weights. Generally it will be more convenient to weigh the dry silt. It will also be appreciated that the whole of the dewatered slurry may be dried, ground and subjected to the second separation process.

Similarly, for the specific plant instanced other suitable plant may be substituted for achieving the same result. For example, other methods of dewatering than by a centrifuge may be adopted if preferred.

Table I below shows the errors in aggregate/cement (A/C) ratio obtained by full scale tests of the process where the constituents of the original mixes were initially unknown at the time of each test, but were subsequently verified for the purpose of estimating the error. The corrected error—i.e. allowing for a floating fraction of the cement and a dense or sinking fraction of the silt—are are also given.

TABLE I (1)

Coarse aggregate _____ Flint, sandstone
Sand _____ Flint
Original aggregate/cement (A/C) ratio _____ 5.7:1
Proportions obtained by analysis:
    Coarse aggregate _____gm__ 2468.5
    Sand less silt passing 100 mesh sieve ___gm__ 1330
    Slurry passing 100 mesh sieve _____gm__ 701.5
    Silt content (floating fraction) (4%)__gm__ 28
    Cement _____gm__ 673.5
Total of aggregates _____gm__ 3826.5
A/C ratio by analysis _____ 5.68:1
Error _____percent__ 0.35
Corrected error _____do____ 2.8

(2)

Coarse aggregate _____ Flint, sandstone
Sand _____ Silica
Original A/C ratio _____ 6:1
Proportions obtained by analysis:
    Coarse aggregate _____gm__ 2238
    Sand less silt passing 100 mesh sieve ___gm__ 1152
    Slurry passing 100 mesh _____gm__ 562
    Silt content (2%) _____gm__ 11.2
    Cement _____gm__ 552
Total of aggregates _____gm__ 3401.2
A/C ratio by analysis _____ 6.17:1
Error _____percent__ 2.84
Corrected error _____do____ 0.33

(3)

Coarse aggregate _____ Flint, quartz, sandstone
Holm sand, sea dredged _____
Original A/C ratio _____ 9:1
Proportions obtained by analysis:
    Coarse aggregate _____gm__ 2724
    Sand less silt passing 100 mesh sieve ___gm__ 1344
    Slurry passing 100 mesh sieve _____gm__ 442.5
    Silt content (2.27%) _____gm__ 10.05
    Cement _____gm__ 441.53
Total of aggregates _____gm__ 4078.05
A/C ratio by analysis _____ 9.25:1
Error _____percent__ 2.78
Corrected error _____do____ 1.55

(4)

Coarse aggregate _____ Flint, quartz, sandstone
Sand linmestone _____
Original A/C ratio _____ 5:1
Proportions obtained by analysis:
    Coarse aggregate _____gm__ 2690
    Sand less silt passing 100 mesh sieve ___gm__ 1380
    Slurry passing 100 mesh sieve _____gm__ 1249
    Silt content (29.22%) _____gm__ 365
    Cement _____gm__ 885
Total of aggregates _____gm__ 4435
A/C ratio by analysis _____ 5.01:1
Error _____percent__ 0.2
Corrected error _____do____ 3.0

(5)

Coarse aggregate _____ Flint, sandstone
Sand _____ Basalt, quartz-dolerite
Original A/C ratio _____ 6:1
Proportions obtained by analysis:
    Coarse aggregate _____gm__ 2764.3
    Sand less silt passing 100 mesh sieve ___gm__ 1094.5
    Slurry passing 100 mesh sieve _____gm__ 899
    Silt content (24%) _____gm__ 216
    Cement _____gm__ 683
Total of aggregates _____gm__ 4076.8
A/C ratio by analysis _____ 5.98:1
Error _____percent__ 0.33
Corrected error _____do____ 3.3

(6)

Coarse aggregate _____ Flint, sandstone
Sand _____ Flint
Original A/C ratio _____ 4:1
Proportions obtained by analysis:
    Coarse aggregate _____gm__ 2296.7
    Sand less silt passing 100 mesh sieve ___gm__ 1342
    Slurry passing 100 mesh sieve _____gm__ 896
    Silt content (3%) _____gm__ 26.9
    Cement _____gm__ 869
Total of aggregates _____gm__ 3665.6
A/C ratio by analysis _____ 4.2:1
Error _____percent__ 5.5
Corrected error _____do____ 2.5

(7)

Coarse aggregate _____ Flint, sandstone
Sand _____ Flint
Original A/C ratio _____ 5.7:1
Proportions obtained by analysis:
    Coarse aggregate _____gm__ 2488
    Sand less silt passing 100 mesh sieve ___gm__ 1327
    Slurry passing 100 mesh sieve _____gm__ 690
    Silt contents (5.27%) _____gm__ 36.3
    Cement _____gm__ 653.7
Total of aggregates _____gm__ 3851.3
A/C ratio by analysis _____ 5.9:1
Error _____percent__ 3½
Corrected error _____do____ 0.88

Test 8 below is amplified to show how a result of an analysis according to the present invention was corrected. The mass of dried cement was seen to be generally green in colour, and a very small percentage of floating fraction silt was obtained from the second stage centrifuge 32. Consequently, a "blank" test of the starting materials was made and a sinking fraction of silt equal to 64% of the floating fraction was found.

(8)

| | |
|---|---|
| Original A/C ratio | 9:1 |
| Proportions obtained by analysis: | |
| Coarse aggregate _____gm__ | 2748.2 |
| Sand (green colour) _____gm__ | 1156.0 |
| Silt (floating fraction) _____gm__ | 149.0 |
| Cement _____gm__ | 565.0 |
| Total of aggregates _____gm__ | 4053.2 |
| A/C ratio by analysis _____ | 7.16:1 |
| Dry cement/silt slurry _____gm__ | 714.0 |
| Sinking fraction silt (64% of 149.0) ____gm__ | 95.36 |
| Total silt _____gm__ | 244.36 |
| Actual cement _____gm__ | 469.64 |
| Corrected A/C ratio by analysis _____ | 8.9:1 |
| Corrected error _____percent__ | 1.1 |

Results of other similar tests are abstracted in Table II below to indicate the order of process error. In this table, the classification of the fine aggregate (sand) is shown together with the type of the cement used. The coarse aggregate in each case was the same. The starting A/C ratio is compared with the ratio found by the process, and the percentage error is given, corrected for the floating fraction of the cement and the sinking fraction of the silt, as explained hereinbefore. Each factor was the average value for all sources in Great Britain, and the factor for the sinking fraction of silt was the average of a representative number of sources of aggregate in Great Britain.

TABLE II

| Aggregate class, sand | Cement type | Original A/C ratio | Process A/C ratio | Error, percent |
|---|---|---|---|---|
| Flint | R.H.P.C | 5.70:1 | 5.65:1 | −0.87 |
| Do | R.H.P.C | 5.66:1 | 5.66:1 | 0-0 |
| Do | R.H.P.C | 4.00:1 | 4.10:1 | +2.5 |
| Do | R.H.P.C | 4.00:1 | 3.90:1 | −2.5 |
| Silica sand | R.H.P.C | 6.00:1 | 6.18:1 | +3.0 |
| Flint | R.H.P.C | 4.50:1 | 4.62:1 | +2.6 |
| Do | R.H.P.C | 4.45:1 | 4.49:1 | −0.2 |
| Do | R.H.P.C | 6.00:1 | 6.20:1 | +3.0 |
| Do | R.H.P.C | 6.00:1 | 6.17:1 | +2.0 |
| Sandstone, basalt, quartz, felspar silica, granite, limestone, etc. | R.H.P.C | 6.00:1 | 5.98:1 | −0.3 |
| Flint | R.H.P.C | 6.00:1 | 6.15:1 | +2.5 |
| Do | O.P.C | 5.70:1 | 5.90:1 | +3.5 |
| Do | R.H.P.C | 5.68:1 | 5.68:1 | 0 |
| Do | O.P.C | 5.68:1 | 5.79:1 | +1.9 |
| Quartzite, quartz, shell, mudstone, shale, flint, sandstone. | R.H.P.C | 4.50:1 | 4.55:1 | +1.1 |
| Do | R.H.P.C | 6.10:1 | 6.05:1 | 0.83 |
| Do | R.H.P.C | 9.00:1 | 9.25:1 | 2.7 |
| Flint | R.H.P.C | 5.68:1 | 5.78:1 | 2.0 |
| Do | R.H.P.C | 6.00:1 | 6.00:1 | 0 |
| Do | R.H.P.C | 6.00:1 | 6.15:1 | 2.1 |
| Do | O.P.C | 5.68:1 | 5.79:1 | 1.9 |

The maximum error range is seen to be +3.5% to −2.5%, and this is negligible for on-site checking of the correctness of the mix to customer's specification.

We claim:

1. The method of determining the composition of unhardened concrete comprising taking a known sample of the concrete and subjecting it to a wet separation process for separating the cement and silt as a slurry from the coarse aggregate and sand; drying the slurry to remove both the free and the combined water from the cement fraction; pulversing at least a known proportion of the dried slurry and subjecting it to a second separation process for separating the cement from the silt; collecting and drying the separate cement and silt fractions; drying the coarse aggregate and sand fractions, and weighing the dried fractions.

2. The method according to claim 1, wherein the drying process of at least the slurry is carried out by means of microwave radiation.

3. The method according to claim 2, wherein the microwave drying is carried out at controlled power for a predetermined time in order to avoid chemical change in the cement fraction due to overheating and to ensure repeatability of the results in successive analyses.

4. The method according to claim 1 wherein the coarse aggregate and sand fractions are separated from the cement and silt slurry by a two-stage wet-sieving process.

5. The method according to claim 4 wherein, prior to drying, the excess water is removed from the slurry and the recovered water is recirculated to the wet separation process.

6. The method according to claim 1, wherein the cement and silt fractions are separated in a dense medium having a specific gravity intermediate those of the cement and the silt.

7. The method according to claim 6, wherein the silt is decanted from the dense medium and centrifugally filtered before drying and weighing.

8. The method according to claim 6 wherein the dried slurry is subdivided, and a known proportion of the total is subjected to the dense medium separation.

9. The method according to claim 1 wherein the dried slurry is ground to a predetermined particle size, preferably between 10 and 60 microns.

10. The method according to claim 9 wherein the grinding is continued for a fixed period to ensure repeatability of results in successive analyses.

References Cited

UNITED STATES PATENTS 2,476,377   7/1949   Le Clair _____ 233—21
3,236,600   2/1966   Shrimpton et al. _____ 23—230

LOUIS R. PRINCE, Primary Examiner

HARRY C. POST III, Assistant Examiner

U.S. Cl. X.R.

73—61; 233—21

UNITED STATES PATENT OFFICE
CERTIFICATE OF CORRECTION

Patent No. 3,499,328                    Dated March 10, 1970

Inventor(s)    Robert Anthony Kenny et al.

It is certified that error appears in the above-identified patent and that said Letters Patent are hereby corrected as shown below:

Column 1, lines 3 and 4, "Bruce Murray Lionel Gregorie" should read -- Bruce Murray Lionel Gregorie Tulloch --. Column 3, line 1, "plane" should read -- plan --; line 57, "sieve" should read -- sieves --. Column 5, line 42, "prevent" should read -- prevents --.

Signed and sealed this 3rd day of November 1970.

(SEAL)
Attest:

EDWARD M. FLETCHER, JR.            WILLIAM E. SCHUYLER JR.
Attesting Officer                  Commissioner of Patents